United States Patent
Brunswig et al.

(10) Patent No.: US 8,074,229 B2
(45) Date of Patent: Dec. 6, 2011

(54) CO-EXECUTION OF OBJECTS FROM DIVERGENT RUNTIME ENVIRONMENTS

(75) Inventors: Frank Brunswig, Heidelberg (DE); Jan Heiler, Walldorf (DE); Martin Helm, Bad Schoenborn (DE); Wolfgang Nieswand, Muehlhausen (DE); Joerg Rosbach, Heidelberg (DE)

(73) Assignee: SAP AG, Walldorf (DE)

( * ) Notice: Subject to any disclaimer, the term of this patent is extended or adjusted under 35 U.S.C. 154(b) by 1039 days.

(21) Appl. No.: 11/880,050

(22) Filed: Jul. 18, 2007

(65) Prior Publication Data
US 2009/0025009 A1   Jan. 22, 2009

(51) Int. Cl.
G06F 3/00 (2006.01)
G06F 9/44 (2006.01)
G06F 9/46 (2006.01)
G06F 13/00 (2006.01)

(52) U.S. Cl. ...................................................... 719/312
(58) Field of Classification Search .................... 719/312
See application file for complete search history.

(56) References Cited

U.S. PATENT DOCUMENTS

| | | | |
|---|---|---|---|
| 7,346,909 B1* | 3/2008 | Eldar et al. | 719/312 |
| 7,500,252 B1* | 3/2009 | Angeline et al. | 719/330 |
| 2003/0088604 A1* | 5/2003 | Kuck et al. | 709/1 |
| 2005/0125486 A1* | 6/2005 | Chrysanthakopoulos et al. | 709/201 |

OTHER PUBLICATIONS

Microsoft Computer Dictionary, Fifth Edition, 2002, pp. 563.*
Google definition search for "coexecution" performed on Dec. 8, 2010.*

* cited by examiner

*Primary Examiner* — Andy Ho
*Assistant Examiner* — Timothy A Mudrick
(74) *Attorney, Agent, or Firm* — Kenyon & Kenyon LLP

(57) ABSTRACT

Systems and methods are described that permit objects from runtime environments that are incompatible with one another to be co-executed on a computing machine. Depending on which object can service the request, a generic proxy may send the request to the proxy of the particular runtime environment associated with that object. The proxy may call the appropriate methods of the object therein to service the request. Each runtime environment may be isolated from other runtime environments by a container such that catastrophic errors in one runtime environment do not disrupt the execution of objects in another runtime environment. A first object in a first runtime environment may execute methods in a second object in a second runtime environment by invoking a proxy of the second runtime environment to call the methods of the second object.

16 Claims, 5 Drawing Sheets

CO-EXECUTION OF OBJECTS FROM DIVERGENT RUNTIME ENVIRONMENTS

BACKGROUND

Objects typically execute in a runtime environment specific to the object's type. Thus, on a particular computing machine, objects from different environments are typically not co-executed to perform a single task. Concerns, such as (1) over duplication of interfaces and (2) issues with catastrophic failures in one runtime environment disrupting another runtime environment, drive developers to construct systems that are built of objects of a single type.

DETAILED DESCRIPTION

Example systems and methods are described that permit objects from runtime environments that are incompatible with one another to be co-executed on a computing machine. Depending on which object can service the request, a generic proxy may send the request to the proxy of the particular runtime environment associated with that object. The proxy may call the appropriate methods of the object therein to service the request. Each runtime environment may be isolated from other runtime environments by a container such that catastrophic errors in one runtime environment do not disrupt the execution of objects in another runtime environment. A first object in a first runtime environment may execute methods in a second object in a second runtime environment by invoking a proxy of the second runtime environment to call the methods of the second object. Fast communication between the first runtime environment and second runtime environment may be accomplished using shared memory. In this way, objects from divergent runtime environments may be co-executed on the same machine.

In embodiments of the present invention, the software objects or business software objects run or are executed in the same transaction. In further embodiments, a transaction manager co-executes the multiple software objects. In further embodiments, the transaction manager can lock an object so as to keep control when the same object is being handled in two different environments. For example, in the situation of a sales order which is being viewed and edited by two persons—unbeknownst to each other—only one person will have the option to save the edits. The other person may receive an error message. In further embodiments, a locking manager may handle and/or control the locking of objects and the like.

In embodiments of the present invention, in an enterprise transaction, dynamic metadata is available in the different runtime environments. Dynamic data may be stored in a shared memory so that it is accessible for all different systems. Accordingly, in an embodiment of the present invention, the metadata stored in a central repository is shared.

Figure 1:
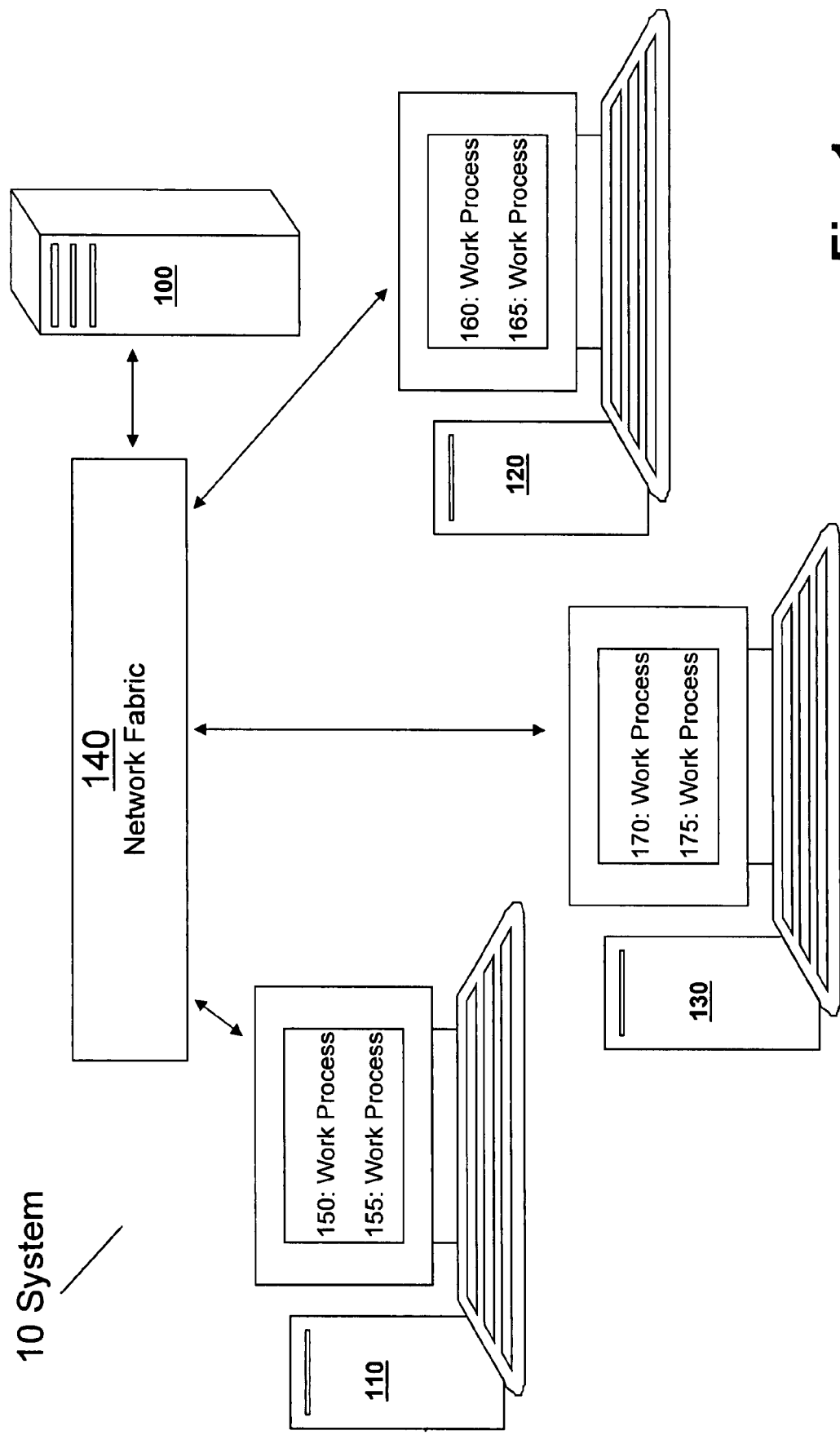
FIG. 1 shows an example general computing environment embodiment of the present invention.

FIG. 1 shows an example computing environment according to an embodiment of the present invention. A system 10 may include a database server 100 and application servers 110, 120, and 130 connected to a network fabric 140. The application servers may send and receive data from the database 100 over the network 140, for example, communicating via Structured Query Language. The application servers 110, 120, and 130 may run work processes 150-175. Each work process may be a stand alone program, for example a user application, or may exist as part of another work process, for example a sub-process or child thread.

Figure 2:
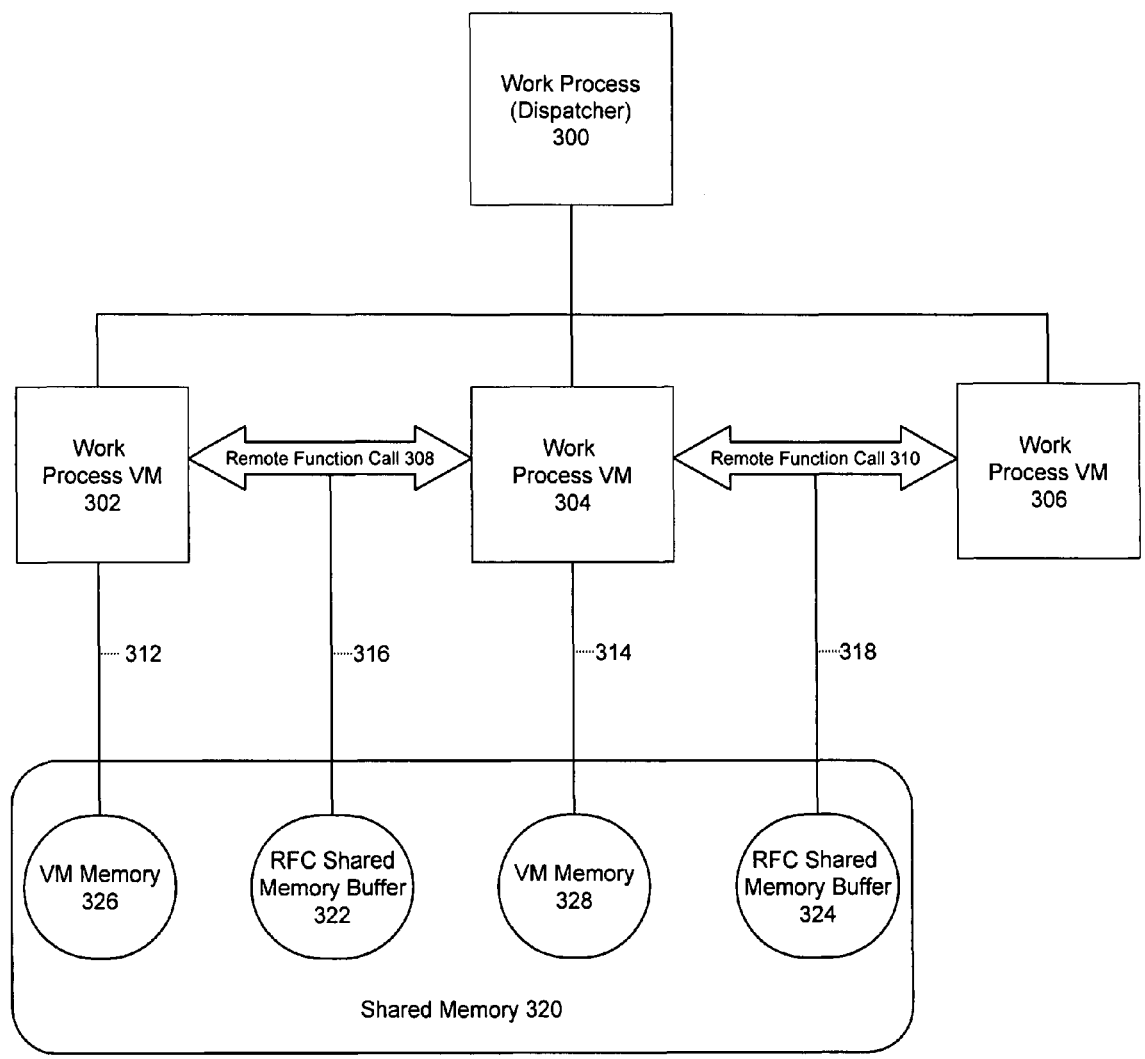
FIG. 2 shows an example system embodiment of the present invention.

FIG. 2 shows an example system according to an embodiment of the present invention. An application server may include three runtime environments, for example work process virtual machines (VM), 302, 304, and 306, which are configured to execute business objects. Work process VMs may be incompatible with respect to one another. For example a particular work process VM may be incapable of executing objects from other work process VMs. Each work process VM may be isolated from the remaining work process VMs such that catastrophic consequences of execution in one work process VM do not affect the remaining ones. Objects of the remaining work process VMs may continue to run after such catastrophic events. Example catastrophic events may include core dumps, application halts, and other runtime errors. Process isolation may be accomplished by encapsulating each runtime environment in a container. For example, each work process VM 302-306 may be encapsulated in a virtual machine container (VMC) which is responsible for constructing an environment to execute the business objects therein, as well as to trap each exception and error thereby generated.

The runtime environments may communicate with each other using appropriate fast communication techniques, such as remote function call (RFC), such as RFC's 308 and 310 connecting work process virtual machine 302 to 304 and 304 to 306. Communication between runtime environments may be based on shared memory 320, such as through channels 316 and 318. Each communication channel 316 and 318 may be associated with a segment of the shared memory 320, RFC shared memory buffers 322 and 324 respectively. Shared memory communication may avoid the lag associated with remote communications, such as communications over a network.

The runtime environments may share data by accessing common shared memory. For example, work processes VMs 302 and 304 may interface with shared memory 320 over channels 312 and 314, each accessing segments of shared memory 320, virtual machine shared memory 326 and 328 respectively. In this way, objects from different runtime environments may act on the same set of data and may be co-executed to accomplish a single user task. For example, runtime environment 302 may include superior user-interface methods while runtime environment 304 may include superior database access methods. To harness the advantages of the two runtime environments, objects may be created to take advantage of these advantageous runtime features and may be run together to accomplish a single user task.

Figure 3:
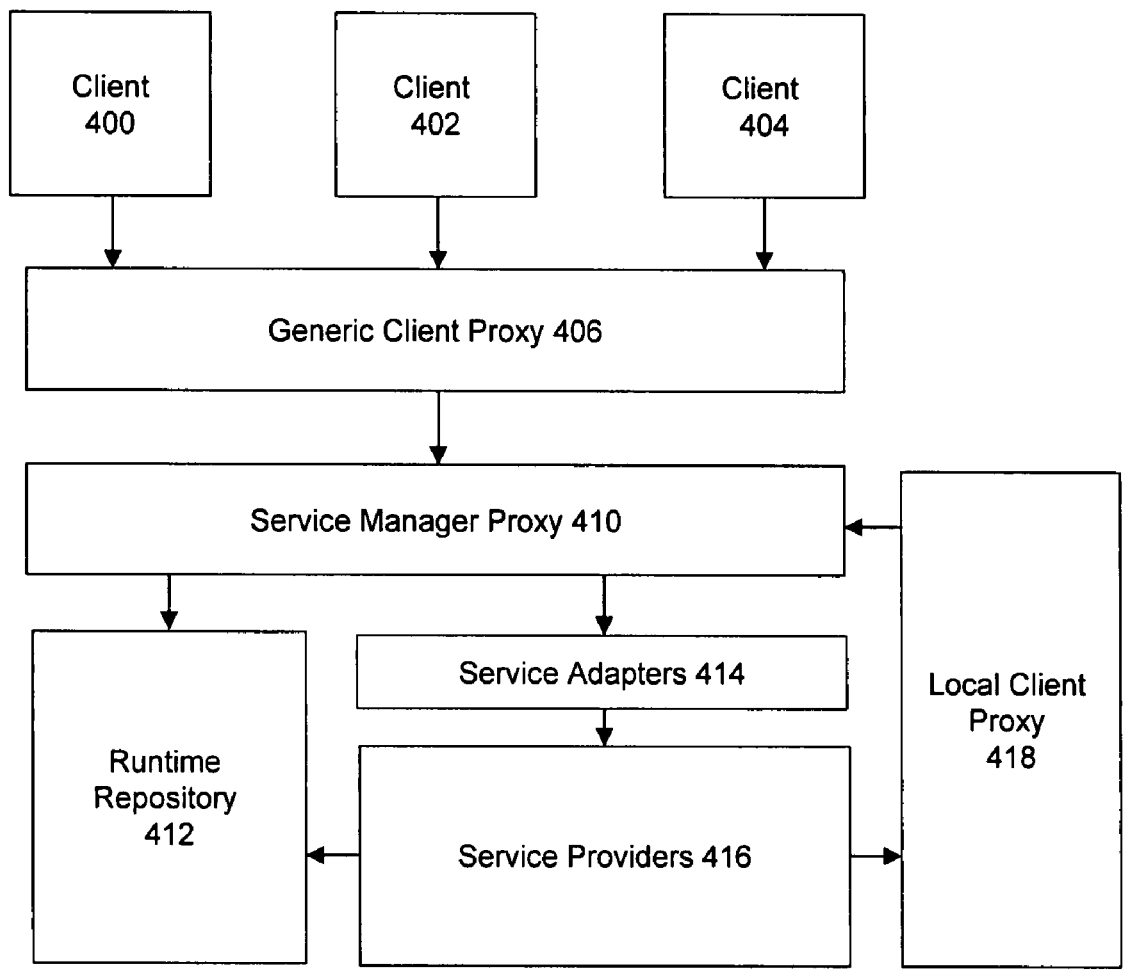
FIG. 3 shows an example system embodiment of the present invention.

FIG. 3 shows an example system according to an embodiment of the present invention. Clients 400, 402, and 404 may communicate with the system to access business objects. Communications from the clients may be channeled through a generic client proxy 406. The generic client proxy 406 may serve as the single interface for clients wishing to access the business objects within the application server. For example, the generic client proxy 406 may determine the order of fulfillment and priority of requests from the clients 400-404.

The generic client proxy 406 may invoke a service manager proxy 410. The service manager proxy 410 may serve as the interface for accessing business objects from client requests and from other business objects.

The business objects may be implemented in service providers 416. Each service provider may provide an interface to the business objects therein by implementing interfaces as defined by service adapters 414. The service adapters 414 may provide a uniform interface for accessing the objects, for example providing a single interface no matter whether the object is implemented in one runtime environment or another.

The runtime repository 412 may store data and objects needed for the execution of the business objects. For example, the runtime repository may store data shared between objects from different runtime environments.

To satisfy a client request from the generic client proxy 406, the service manager proxy 410 may call a method of a business object by using an interface as defined by the service adapters 414. The business objects may also call methods of other business objects within the same runtime environment by invoking the service manager proxy 410. For example, a first business object within a service provider may wish to call a method of a second object within the same runtime environment. The first business object may invoke a local client proxy 418 which may in turn invoke the service manager proxy 410. The service manager proxy 410 may service the call request from the object, arriving from the local client proxy, by calling an appropriate method of the second business object.

Figure 4:
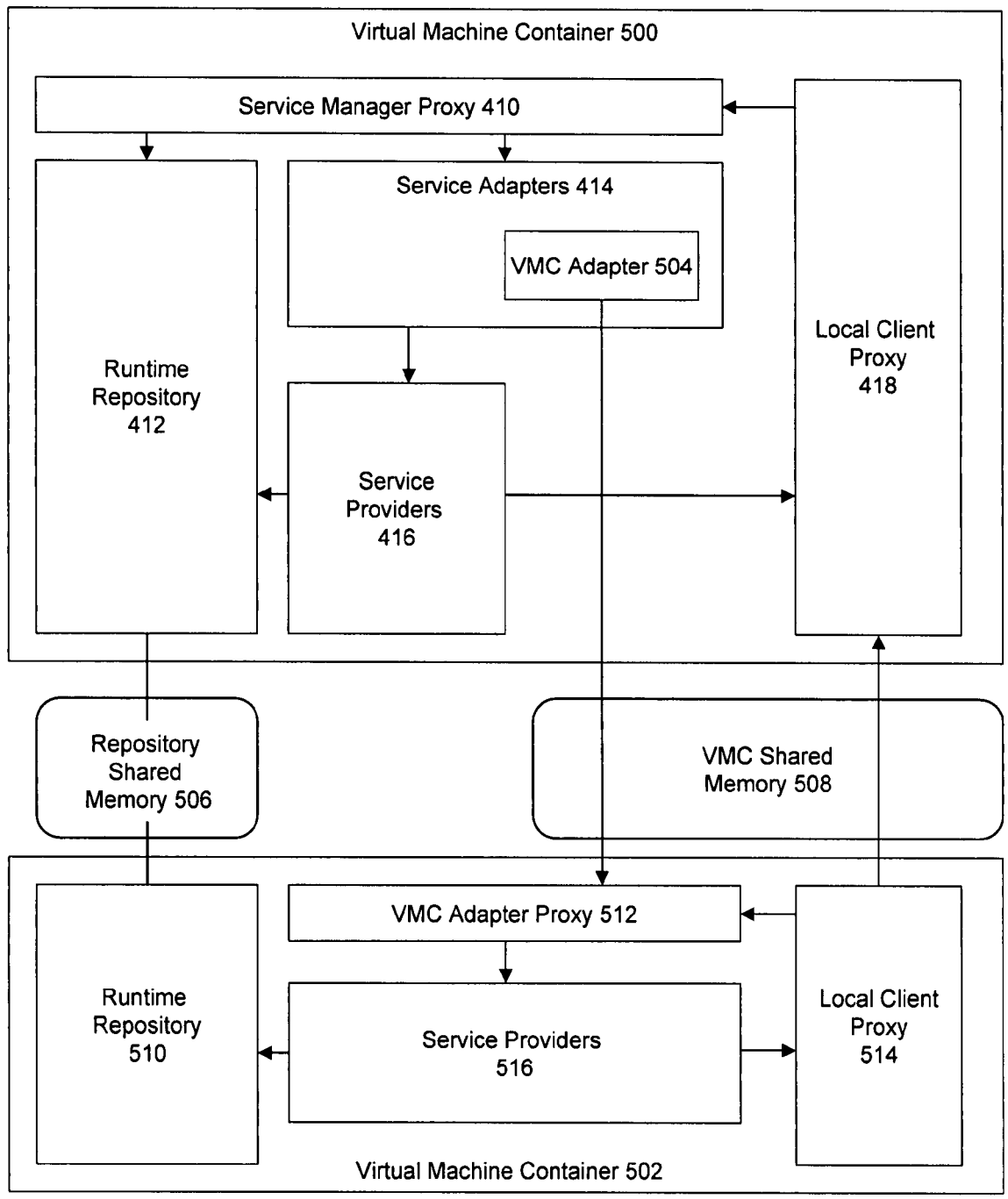
FIG. 4 shows an example system embodiment of the present invention.

FIG. 4 shows an example system according to an embodiment of the present invention. Containers, for example, virtual machine containers 500 and 502, may be isolated from one another such that core dumps and other catastrophic events in one container may not effect the execution of business objects in the other. For example, each virtual machine container may execute a runtime environment as an application. The virtual machine container may trap exceptions, errors, and other catastrophic events to prevent the other runtime environments co-executed on the computing machine from being affected. In one example embodiment, the runtime environment may exist as a typical virtual machine, and objects executed therein may be interpreted by the virtual machine. The virtual machine may trap all errors and exceptions of the objects so as to protect the rest of the objects in other virtual machines.

In one example embodiment, the business objects of virtual machine container 500 may not be executed in the virtual machine container 502 and vice versa, for example, if objects of virtual machine container 500 are encoded in a different language than those of virtual machine container 502.

In addition to providing a uniform set of interfaces for accessing objects within the same runtime environment, the service adapters 414 may provide interfaces for objects in another runtime environment. For example, the service manager proxy 410 may call methods of business objects within the virtual machine container 502 by way of virtual machine container adapter 504. Even though the objects exist in the second, different virtual machine container and may not be executed in the first virtual machine container, they may be invoked via the virtual machine container adapter 504.

The service manager proxy 410 may call a method of an object in the second runtime environment by invoking a proxy in the second runtime environment. For example, the interface, the VMC adapter 504, may be implemented to invoke a VMC adapter proxy 512. The VMC adapter proxy 512 may call the appropriate method of the target business object implemented within the service providers 516. The VMC adapter 504 and VMC adapter proxy 512 may share a segment of shared memory, VMC shared memory 508. Communications between VMC adapter 504 and VMC adapter proxy 512 may thus be fast, for example the communications may be based on remote function calls that use the VMC shared memory 508.

The runtime repositories 412 and 510 may likewise share a segment of shared memory, for example runtime repository shared memory 506. In this way, the objects executed in different runtime environments may access the same data and may be used in tandem to accomplish the same user task.

Like VMC 500, business objects of VMC 502 may call methods of objects within the same VMC by invoking the VMC adapter proxy 512. For example, business objects within the service providers 516 may invoke the local client proxy 514, which may in turn invoke the VMC adapter proxy 512, which may call the appropriate method.

The business objects of the VMC 502 may call methods of business objects in VMC 500. The business object within service providers 506 may invoke the local client proxy 514, which may in turn invoke the local client proxy 418. The local client proxy 418 may invoke the service manager proxy 410, which may call the appropriate methods.

Figure 5:
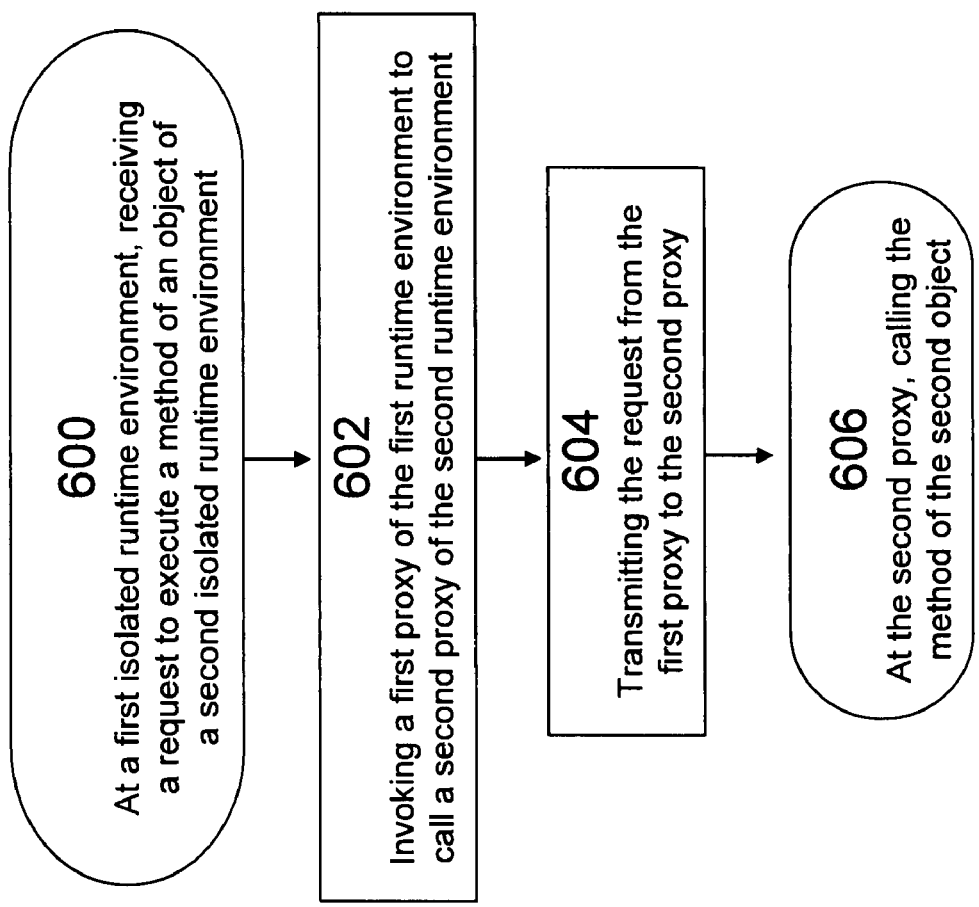
FIG. 5 shows an example process embodiment of the present invention.

FIG. 5 shows an example process according to an example embodiment of the present invention. In box 600, at a first isolated runtime environment, a request to execute a method of an object of a second isolated runtime environment is received. In box 602, a first proxy of the first runtime environment is invoked to call a second proxy of the second runtime environment. In box 604, the request is transmitted from the first proxy to the second proxy. In box 606, at the second proxy, the method of the second object is called.

One example embodiment includes a first runtime environment configured to execute a first object, a second runtime environment configured to execute a second object, the first and second runtime environments further configured to be isolated from one another, a first proxy associated with the first runtime environment, a second proxy associated with the second runtime environment, a first container configured to execute the first runtime environment and to isolate the first runtime environment from catastrophic errors in the second runtime environment, a second container configured to execute the second runtime environment and to isolate the second runtime environment from catastrophic errors in the first runtime environment, and a generic proxy configured to either call a method of the first object by invoking the first proxy, the first proxy configured to call the method of the first object or call a method of the second object by invoking the second proxy, the second proxy configured to call the method of the second object, wherein the second runtime environment is incompatible with the first object and the first runtime environment is incompatible with the second object.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A system for co-execution of objects from divergent runtime environments to run together to accomplish a task, comprising:
    a storage component device including a machine readable medium storing a data set in a segment of memory accessible to a plurality of objects in a plurality of runtime environments;
    a first and a second runtime environment configured to contain respective objects acting on the data set in the accessible memory segment, the first and second runtime environments further configured to be isolated from one another and incompatible with each other's objects;
    a processing device to execute a first object in the first runtime environment and a second object in the second runtime environment;
    a generic proxy arrangement to provide a single interface for client requests from different systems to access a business object;
    a local client proxy to facilitate executing another business object;
    a service manager proxy arrangement in each runtime environment to call a method of a requested business object received through the generic proxy arrangement and to call another method of another requested business object received through the local client proxy, the service manager proxy arrangement serving as an interface for accessing the requested business objects;
    a service adapter in the first runtime environment to provide an uniform interface for accessing each business object, the service adapter including a virtual machine container adapter to interface with a virtual adapter proxy in a different runtime environment to obtain access to a business object in the different runtime environment, the virtual machine container adapter configured to provide the uniform interface for accessing the business object in the different runtime environment; and
    a service provider to provide instructions to the processing device to execute a business object;
    wherein, responsive to a request from a client to act on the data set, the generic proxy arrangement invokes the service manager proxy arrangement in the first runtime environment, which invokes the service provider in the first runtime environment to execute a first business object associated with the client request through the service adapter in the first runtime environment, and
    responsive to the first business object calling a method of a second business object during execution in the first runtime environment, the service provider in the first runtime environment invokes the local client proxy in the first runtime environment to instantiate a second service manager proxy arrangement in the first runtime environment through which the service adapter invokes the virtual machine container adapter to communicate with the second runtime environment if the second business object is in the second runtime environment, otherwise the service adapter invokes a second service provider to execute the second business object in the first runtime environment.

2. The system of claim 1, wherein the co-execution of the first and second objects occurs in a single transaction.

3. The system of claim 2, wherein each of the first and second objects is associated with a respective metadata, the metadata being stored in a shared repository, the shared repository being accessible to the first and second runtime environments.

4. The system of claim 1, further comprising:
    a first container configured to contain the first runtime environment and to isolate the first runtime environment from a runtime error in the second runtime environment; and
    a second container configured to contain the second runtime environment and to isolate the second runtime environment from a runtime error in the first runtime environment.

5. The system of claim 1, wherein the virtual machine container adapter communicates with the second runtime environment via a shared memory.

6. The system of claim 1, wherein the virtual machine container adapter communicates with the second runtime environment using remote function calls.

7. The system of claim 1, wherein the first runtime environment is configured to execute a third object and the second runtime environment is configured to execute a fourth object, and
    wherein the third and fourth objects are configured to share data using a shared memory.

8. The system of claim 1, wherein the first runtime environment includes an Advanced Business Application Programming (ABAP) virtual machine and the second runtime environment includes a Java virtual machine.

9. The system of claim 1, wherein the first runtime environment is configured to execute a third object, and
    wherein the first object is configured to call a method of the third object by invoking the local client proxy and the local client proxy is configured to call the method of the third object.

10. A method of executing objects from divergent runtime environments, comprising:
    responsive to a request from a client to act on a data set stored in a segment of memory in a machine readable medium of a storage component device, the segment of memory accessible to a plurality of objects in a plurality of runtime environments,
    providing a single interface for client requests from different systems to access a business object through a generic proxy arrangement;
    invoking a first service manager proxy arrangement in a first runtime environment to call a method of a client requested business object received through the provided single interface for accessing the requested business object;
    executing the called method of the client requested business object;
    responsive to the client requested business object calling a method of a second business object during execution in the first runtime environment:
    invoking a local client proxy in the first runtime environment;

instantiating a second service manager proxy arrangement in the first runtime environment through the invoked local client proxy;

identifying whether the second business object is in the first runtime environment or a second runtime environment;

if the second business object is in the first runtime environment:

invoking a service provider through the second service proxy arrangement, the service provider supplying instructions to a processing device for executing the second business object in the first runtime environment; and executing the second business object in the first runtime environment according to the supplied instructions; and if the second business object is in the second runtime environment:

invoking a virtual machine container adapter to pass instructions from the first runtime environment to the second runtime environment; and executing the called method of the second business object in the second runtime environment according to the passed instructions.

11. The method of claim 10, wherein at least one request is transmitted via a shared memory.

12. The method of claim 10, wherein at least one request is transmitted via a remote function call.

13. The method of claim 10, wherein the first runtime environment includes an Advanced Business Application Programming (ABAP) virtual machine and the second runtime environment includes a Java virtual machine.

14. The method of claim 10, further comprising:

sharing data between a third object of the first runtime environment and a fourth object of a second runtime environment using a shared memory.

15. A system for co-execution of objects from divergent runtime environments, comprising:

a storage component device including a machine readable medium storing a data set in a segment of memory accessible to a plurality of objects in a plurality of runtime environments;

a first and a second runtime environment configured to contain respective objects acting on the data set in the accessible memory segment, the first and second runtime environments further configured to be isolated from one another and incompatible with each other's objects;

a first container configured to contain the first runtime environment and to isolate the first runtime environment from a runtime error in the second runtime environment;

a second container configured to contain the second runtime environment and to isolate the second runtime environment from a runtime error in the first runtime environment;

a processing device to execute the first object in the first runtime environment and the second object in the second runtime environment;

a generic proxy arrangement to provide a single interface for client requests from different systems to access a business object;

a local client proxy to facilitate executing another business object;

a service manager proxy arrangement in each runtime environment to call a method of a requested business object received through the generic proxy arrangement and to call another method of another requested business object received through the local client proxy, the service manager proxy arrangement serving as an interface for accessing the requested business objects;

a service adapter in the first runtime environment to provide an uniform interface for accessing each business object, the service adapter including a virtual machine container adapter to interface with a virtual adapter proxy in a different runtime environment to obtain access to a business object in the different runtime environment, the virtual machine container adapter configured to provide the uniform interface for accessing the business object in the different runtime environment; and a service provider to provide instructions to the processing device to execute a business object;

wherein, responsive to a request from a client to act on the data set, the generic proxy arrangement invokes the service manager proxy arrangement in the first runtime environment, which invokes the service provider in the first runtime environment to execute a first business object associated with the client request through the service adapter in the first runtime environment, and responsive to the first business object calling a method of a second business object during execution in the first runtime environment, the service provider in the first runtime environment invokes the local client proxy in the first runtime environment to instantiate a second service manager proxy arrangement in the first runtime environment through which the service adapter invokes the virtual machine container adapter to communicate with the second runtime environment if the second business object is in the second runtime environment, otherwise the service adapter invokes a second service provider to execute the second business object in the first runtime environment.

16. The system of claim 15, further comprising a locking manager to lock down the first and second objects so that the first and second objects are each modifiable by a single entity at a time.

* * * * *